Aug. 7, 1956 W. FESSLER 2,758,230
ARMATURE FOR GENERATORS
Filed June 14, 1951

Inventor
Wilhelm Fessler
by
Stevens, Davis, Miller & Mosher
his attorneys

United States Patent Office 2,758,230
Patented Aug. 7, 1956

2,758,230
ARMATURE FOR GENERATORS

Wilhelm Fessler, Kornwestheim, Germany, assignor to Robert Bosch G. m. b. H., Stuttgart, Germany Application June 14, 1951, Serial No. 231,523

Claims priority, application Germany June 19, 1950

1 Claim. (Cl. 310—265)

The present invention relates to low voltage low capacity generators, and is especially concerned with armatures having parallel sided slots and with armature windings therefor such as are suitable for two-pole commutator generators especially for vehicles.

The term low voltage low capacity as used in this specification is to be understood as meaning a voltage not greater than 75 volts and a capacity not greater than 2 kw.

In armatures having parallel sided slots, it is customary to place in each slot one side of one coil above one side of another coil and, with single strand coils, for all the wires of each coil to be located one above the other. Armatures of this kind have hitherto been wound manually or mechanically by inserting each wire individually into its appropriate slot in the armature. The slots must then be of such width that the wires can slide into the slot without being forced. For holding firm the wires when so inserted, the slots are either closed externally by so-called keys or secured by bandages or binding tapes which are then wound in annular grooves on the periphery of the armature. In one case an unfavourable slot filling factor is obtained and in the other case the flux distribution in the air gap is impaired.

The object of the present invention is to obviate these drawbacks.

According to the present invention the coils are formerly wound and are held in the slots exclusively by friction with the walls of the slot and by the usual medium utilised for varnishing.

By way of example the invention will be further described with reference to the accompanying drawings which illustrate one construction embodying the present invention.

Figure 1:
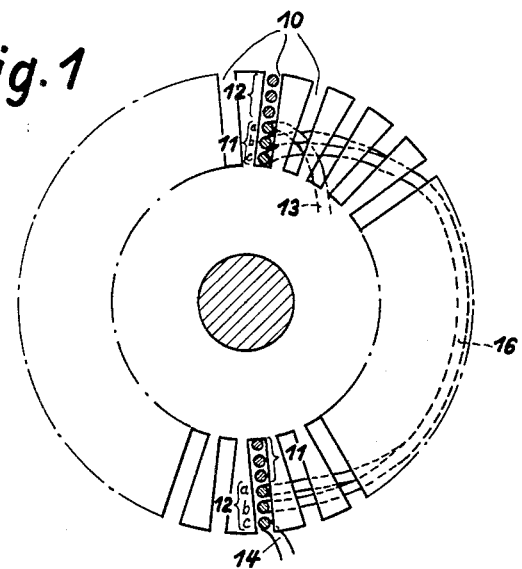
Fig. 1 is a diagrammatic view partly in section of an armature of a two-pole D. C. generator.
Figure 2:
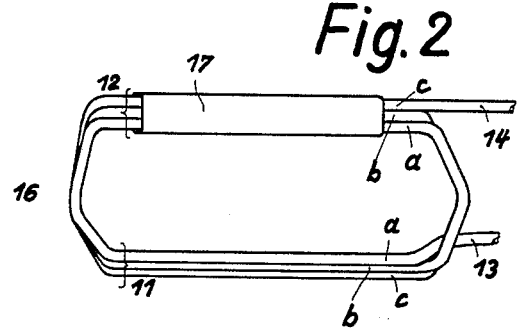
Fig. 2 is a perspective view of a former wound coil before insertion into slots in the armature.
Figure 3:
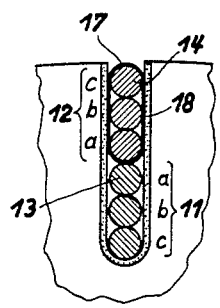
Fig. 3 is a section through a filled armature slot to an enlarged scale.

The armature shown in Fig. 1, which is built up of iron lamina, has thirty open parallel sided slots 10. In each slot there are located one above the other in the usual way two coil sides 11 and 12 of two different coils (two layer winding) the side 11 being the under or inner layer and the side 12 the top or outer later. In each coil side, three wires are likewise located one above the other in the slot, so that in each slot there are six wires located one above the other. The individual coils are wound as single-wire former wound coils in such a manner that the wires a, b, c of one coil side are located one above the other in the reverse sequence to the wires of the other coil side (Fig. 2). Thus with these coils the commencement 13 of the coil side 11 which is in the inner layer, and the termination 14 of the coil side 12 which is in the outer layer are both located at the top or outer part of the coil. The commencement 13 of the coil is carried through under the end loop 16. The coil side 12 of the coil, which forms the top or outer layer, is wound round with a tape 17, which preferably consists of adhesive paper. The slots are each lined with an insulating strip 18 to insulate the winding against sheet metal bodies.

On insertion of the coils into the slots in the armature, all those coil sides of the coils which form the lower or inner layers 11 are first inserted into the slots with comparatively light pressure. The other coil sides, which are still standing out from the periphery of the armature, and which form the top or outer layers 12 on the finished armature are then brought so far up to the periphery of the armature that they come to lie in front of the slots in which they have to be inserted. These coil sides, which are provided with the adhesive tape and which, on account of the adhesive tape, are thicker than the lower or inner coil sides first inserted, are then pressed into the appropriate slots under considerable pressure, each coil side at any time being guided between two surfaces (not shown) brought up to the slot, so that their wires cannot escape laterally when being pressed in. After insertion of the coils, the armature is varnished in the usual way.

The coils pressed into the slots are held exclusively by friction with the walls of the slot and by the medium used for varnishing. Securing means such as keys and bandages or tapes are therefore discarded. The utilising of the slot space thereby becomes extraordinarily favourable and manufacture becomes cheap. There is also the fact that the end portion of the coils projects very little with this type of fitting of the coils. The advantages of the invention have a particularly favourable effect with two-pole machines, because with the latter the reduced end to end length of the windings is of particular importance.

I claim:

In an armature assembly for a low voltage low capacity generator, an armature core having a plurality of peripheral open slots formed with parallel sides, an inner layer of former wound single coil conductors of circular cross-section disposed in the bottom portions of the slots with the coil conductors being radially stacked in the bottom portions of the slots and being of a diameter slightly less than the width of the slots, an outer layer of former wound single coil conductors of the same circular corss-section disposed in the slots in radial stacked arrangement, a sheathing surrounding the said coil conductors in the outer layer and increasing the diameter of the coil conductors, said sheathed coil conductors of the outer layer being contiguous with the inner layer and the outermost conductor being substantially flush with the periphery of the core and being tightly frictionally wedged in the slots against the sides and a varnish cost covering the sheathing and the inner layer whereby to lock the coils in the slots.

References Cited in the file of this patent

UNITED STATES PATENTS

| 559,692 | Fiske et al. | May 5, 1896 |
|---|---|---|
| 565,931 | Short | Aug. 18, 1896 |
| 618,727 | Priest | Jan. 31, 1899 |
| 768,843 | Burke | Aug. 30, 1904 |
| 1,237,459 | Bijur | Aug. 21, 1917 |
| 1,244,709 | Davenport | Oct. 30, 1917 |
| 1,284,552 | Apple | Nov. 12, 1918 |
| 1,320,795 | Pearson | Nov. 4, 1919 |
| 1,375,133 | Cullin | Apr. 19, 1921 |
| 1,392,557 | Cullin | Oct. 4, 1921 |
| 1,974,406 | Apple | Sept. 25, 1934 |
| 2,115,570 | Compton | Apr. 26, 1938 |
| 2,333,538 | Liwschitz | Nov. 2, 1943 |

FOREIGN PATENTS

| 9,008 | Great Britain | Apr. 8, 1897 |